United States Patent [19]

Hilmoe

[11] 4,063,863
[45] Dec. 20, 1977

[54] CENTRIFUGAL CASTING MACHINE HAVING VACUUM ASSIST

[76] Inventor: Larry James Hilmoe, 9419 Caddy Lane, Caledonia, Wis. 53108

[21] Appl. No.: 677,268

[22] Filed: Apr. 15, 1976

[51] Int. Cl.² .......................... B22D 13/06; B29C 5/04
[52] U.S. Cl. ..................... 425/425; 164/254; 164/289; 425/812; 425/DIG. 60
[58] Field of Search ............ 164/61, 63, 65, 253–255, 164/289; 425/425, 812, DIG. 60

[56] References Cited

U.S. PATENT DOCUMENTS

| | | | |
|---|---|---|---|
| 1,488,545 | 4/1924 | Kadow | 165/254 |
| 2,637,079 | 5/1953 | Kemppe | 164/65 UX |
| 3,234,604 | 2/1966 | Anderson | 164/255 |

FOREIGN PATENT DOCUMENTS

| | | | |
|---|---|---|---|
| 951,385 | 4/1949 | France | 164/254 |

Primary Examiner—Robert D. Baldwin
Attorney, Agent, or Firm—Andrus, Sceales, Starke & Sawall

[57] ABSTRACT

A centrifugal casting machine includes a rotatable shaft having a mounting plate for receiving a pair of molds containing the casting cavities. A passage in the shaft has one end connected to a source of vacuum and the other end opening in the plate. A conduit is provided from the casting cavities to the exterior of the molds. Connection means are provided for applying the vacuum in the passage to the cavity through the conduit. The vacuum so applied improves both the operation of the casting machine and the quality of the castings.

4 Claims, 4 Drawing Figures

CENTRIFUGAL CASTING MACHINE HAVING VACUUM ASSIST

BACKGROUND OF THE INVENTION

1. Field of the Invention

The present invention is directed to centrifugal casting equipment having a vacuum assist.

2. Description of the Prior Art

Centrifugal casting techniques rotate the molds containing the casting cavities. The cavities are displaced from the axis of rotation so as to rotate about the axis. The centrifugal forces generated by this rotation drives the casting material into the cavities.

A typical casting system of this type employs molds comprised of two discs of silicone or organic rubber. Models of the items to be molded are placed between the mold discs. The mold discs are then placed in a vulcanizing machine. Pressure and heat are applied to the molds to vulcanize the rubber and form it around the patterns.

After curing, the molds are separated and the patterns removed. Runners are cut from a central sprue of the molds to the edge of each cavity.

The molds are then reassembled and placed in a centrifugal casting machine. After the casting machine has begun spinning, the casting material, such as precatalyzed resin or low temperature metal alloy, is poured in the central sprue. The casting material is thrown into the mold cavities by the centrifugal force where it solidifies. The mold halves are then separated and the castings removed.

While the technique of centrifugal casting has been found to be highly satisfactory, several shortcomings have been noted. It may be difficult to insure that the air displaced by the casting material can escape the cavity. While vents may be provided to the cavity, air can still become trapped in undercuts preventing formation of perfect castings. The turbulence of the casting material and air in the cavity often results in internal voids in the casting.

SUMMARY OF THE PRESENT INVENTION

It is, therefore, the object of the present invention to provide an improvement in centrifugal casting apparatus which enhances the quality of the castings formed by such equipment.

Another object of the present invention is to provide such an improvement which may be fitted to existing centrifugal casting machines without the need for major alteration of the existing equipment.

Briefly, the present invention contemplates applying a vacuum to the cavities of the mold to withdraw the air from the mold prior to filling and thereby insure complete and rapid filling of the cavities. Superior castings are also provided.

The assistance in filling the casting cavity provided by the vacuum permits the use of lower speeds in the centrifugal casting machine and lower temperatures for molten casting materials. The lower temperatures decreases the cycle time of the machine and increases the life of molds such as the silicone rubber molds described above. The lower temperatures and speeds and the vacuum obtained with the present invention improve the quality of the castings by producing denser castings having a minimum of shrinkage and low porosity through a reduction of turbulence within the cavity.

The vacuum also assists in holding the molds together reducing the pressure needed to seal the molds. By reducing the pressure in the mold cavities, the likelihood of distortion of the mold and cavity is significantly reduced.

The vacuum may be applied to the cavity by providing a passage in the shaft which provides rotation to the molds. One end of this passage is connected to a source of vacuum. The other end of the passage opens on the plate which supports the molds on the shaft. A conduit is provided in the molds which connects the mold cavities to the exterior of the molds. Connection means are provided to interconnect the passage and the conduits, thereby to apply the vacuum to the casting cavities.

The end of the shaft passage may open on the surface of the plate which receives the molds. In this event the conduit opens on the abutting surface of the molds and may be connected to the passage by radial channels in the plate. In another embodiment of the invention, the conduit and passage open on the periphery of the molds and plate and a peripheral connection means, typically a peripheral chamber, is employed for purposes of interconnection.

DETAILED DESCRIPTION OF THE PREFERRED EMBODIMENT

Figure 1:
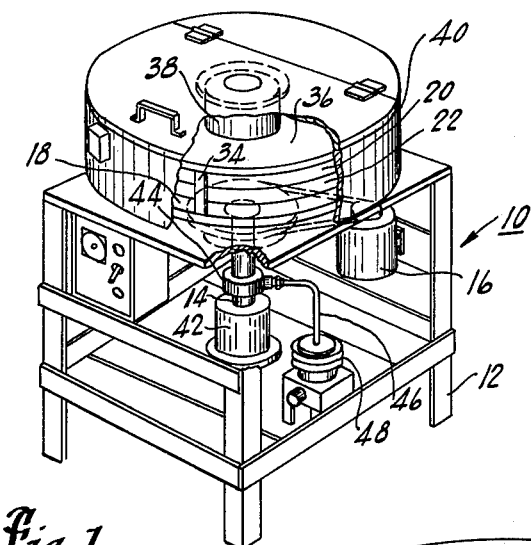
FIG. 1 is a perspective view of the centrifugal casing machine incorporating the present invention.

There is shown in FIG. 1 a centrifugal casting machine 10. The machine includes a frame 12 which supports the machine on the floor. The machine also includes a shaft 14 journalled in frame 12. Shaft 14 is driven by motor 16 for rotation about a vertical axis.

Figure 2:
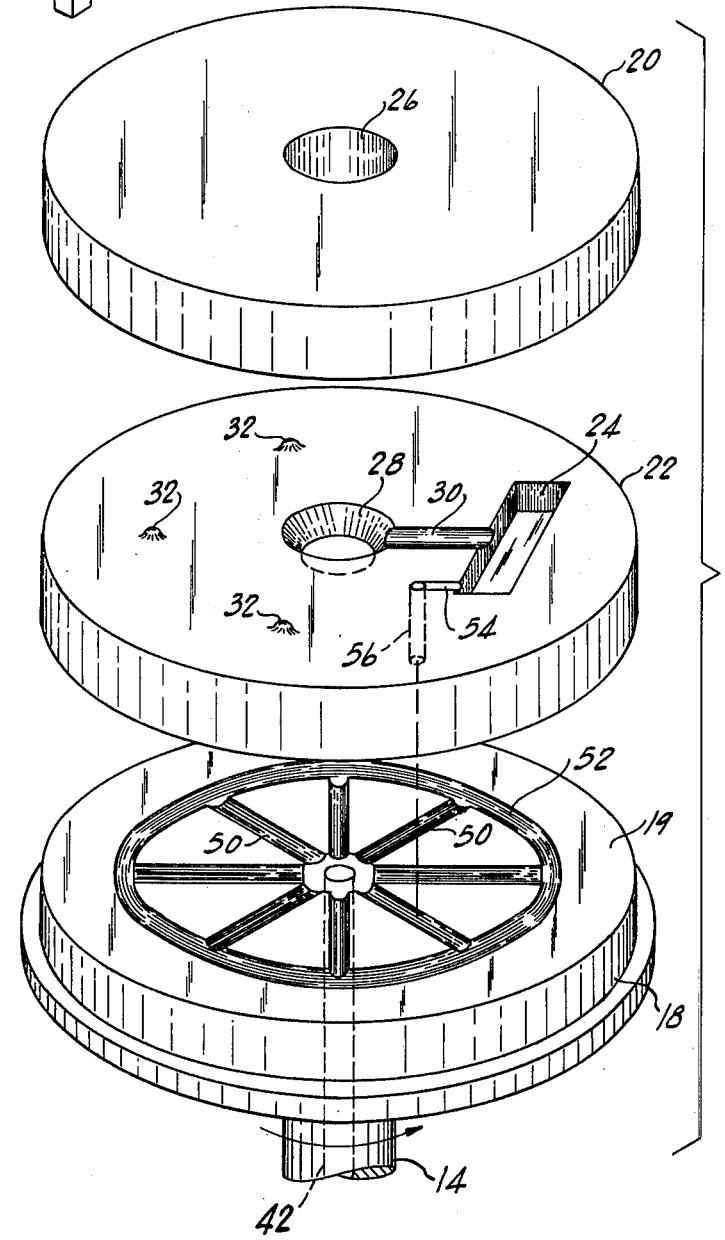
FIG. 2 is a perspective view of portions of the centrifugal casting machine shown in FIG. 1 showing one embodiment of the present invention.

As shown in FIG. 2, plate 18 is mounted on the upper end of shaft 14 to receive on its exposed surface 19, upper mold 20 and lower mold 22. Molds 20 and 22 may be formed of silicone or organic rubber or other suitable material including metal. Molds 20 and 22 contain the mold cavities in which the castings are formed. One such cavity 24 is exemplarily shown in FIG. 2. Upper mold 20 contains central sprue 26 through which the casting material is received in the molds. Lower mold 22 contains depression 28 at the lower end of sprue 26 and runner 30 connecting the sprue with cavity 24. Projections 32 on lower mold 22 mate with corresponding depressions on upper mold 20 for orienting the molds with respect to each other. A clamping means 34 is provided for clamping the molds together with central sprue 26 aligned with the axis of shaft 14. The clamping means may include an upper plate 36 containing funnel 38 for the casting material. Protective shroud 40 surrounds the rotating parts of casting machine 10.

In operation, molds 20 and 22 are clamped between plates 18 and 36 as by actuating air cylinder 42 coupled to the molds. Motor 16 is energized to rotate shaft 14, plates 18 and 36 and molds 20 and 22. The casting material, such as molten metal or catalyzable resin, is poured through funnel 38 into sprue 26 and depression 28. The casting material is flung by the centrifugal forces in the rotating molds down runner 30 and into cavity 24 to fill the cavity and form the casting. When the casting material has hardened, motor 16 is deenergized. Upper plate 36 and molds 20 and 22 are removed from plate 18 and separated along the parting line to remove the casting.

To provide the vacuum to cavity 24, a passage 42 is provided along the axis of shaft 14. The lower end of this passage is connected to rotary valve 44. See FIGS. 3 and 4. Rotary valve 44 connects passage 42 to vacuum tube 46 and vacuum pump 48 mounted on frame 12 as shown in FIG. 1. In the alternative, a central source of vacuum may be used for a plurality of machines. The upper end of passage 42 opens on surface 19 of plate 18 which abuts the lower surface of lower mold 22. In order to connect passage 42 with cavity 24, a plurality of vacuum channels are provided in surface 19 of plate 18. These channels may take the spoked wheel configuration shown in FIG. 2 containing spoke-like channels 50 and rim-like channel 52.

A vacuum channel 54 is cut in the parting surface of lower mold 22. A hole 56 is drilled through lower mold 22 from the end of vacuum channel 54 to open into one of the spoke-like channels 50 or rim-like channel 52 formed in surface 19 of plate 18.

In operation, molds 20 and 22 are assembled on plate 18, making sure that hole 56 opens into a spoke channel 50 or rim channel 52. Vacuum pump 48 is energized to produce a vacuum. The level of vacuum may be generally selected in accordance with the viscosity of the casting material. This vacuum is transmitted through vacuum tube 46, rotating valve 44, vacuum passage 42, the channels 48, 50 in plate 18, hole 56, vacuum channel 54 to cavity 24. Motor 16 is energized to rotate shaft 14, plates 18 and 36, and molds 20 and 22. The vacuum is maintained in cavity 24 by rotating valve 44. The casting material is poured in sprue 26 and supplied by centrifugal force down runner 30 into cavity 24. The evacuation of cavity 24 provided by the vacuum insures attainment of the advantages noted above.

The lessening of the squeezing pressure applied to the molds lessens the likelihood of the compression of molds 20 and 22. blocking channel 54 in the parting surface of one of the molds. The length of channel 54 may be selected so that any casting material drawn into the passage will harden in the channel where it can easily be removed upon opening the molds. Channel 54 may be made labyrithine for this purpose.

When the casting material has hardened, motor 16 and vacuum pump 48 are deenergized. After plates 18 and 36 and upper and lower molds 20 and 22 have stopped spinning, the molds are separated and the casting removed.

Figure 4:
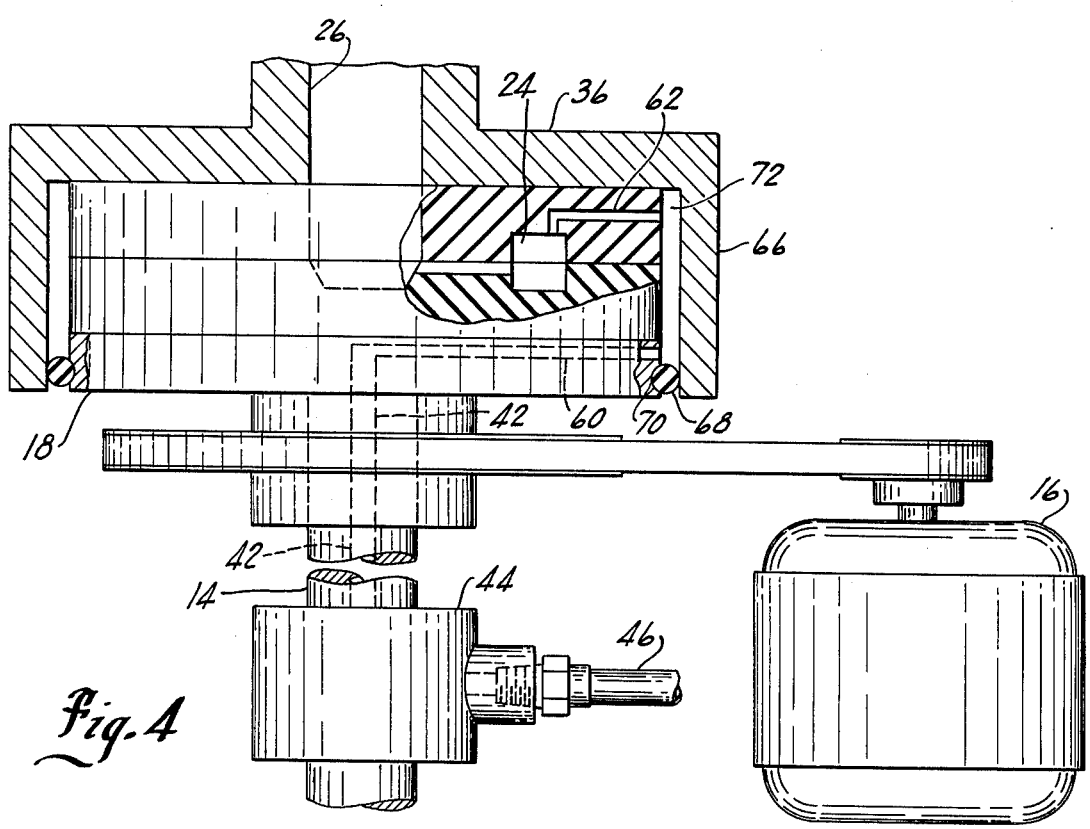
FIG. 4 is a partially broken away elevational view, with certain elements in cross section, showing another embodiment of the present invention.

FIG. 4 shows an alternative embodiment of the present invention. In this embodiment, the vacuum passage 42 in shaft 14 does not open on surface 19 of plate 18 but rather is connected through plate 18 by vacuum passage 60 to the exterior of the plate.

Cavity 24 is connected to the exterior of one of molds 20 and 22 as by a channel along the parting line of the molds, similar to channel 54, or by the passage 62 through one of the molds shown in FIG. 4.

Upper plate 36 which assists in clamping the molds to plate 18 is formed with a depending skirt 66. Skirt 66 of cap 36 extends along the peripheral exterior of molds 20 and 22 and plate 18. An O-ring 68 mounted in groove 70 forms a seal between the lower edge of skirt 66 and plate 18 and chamber 72.

Figure 3:
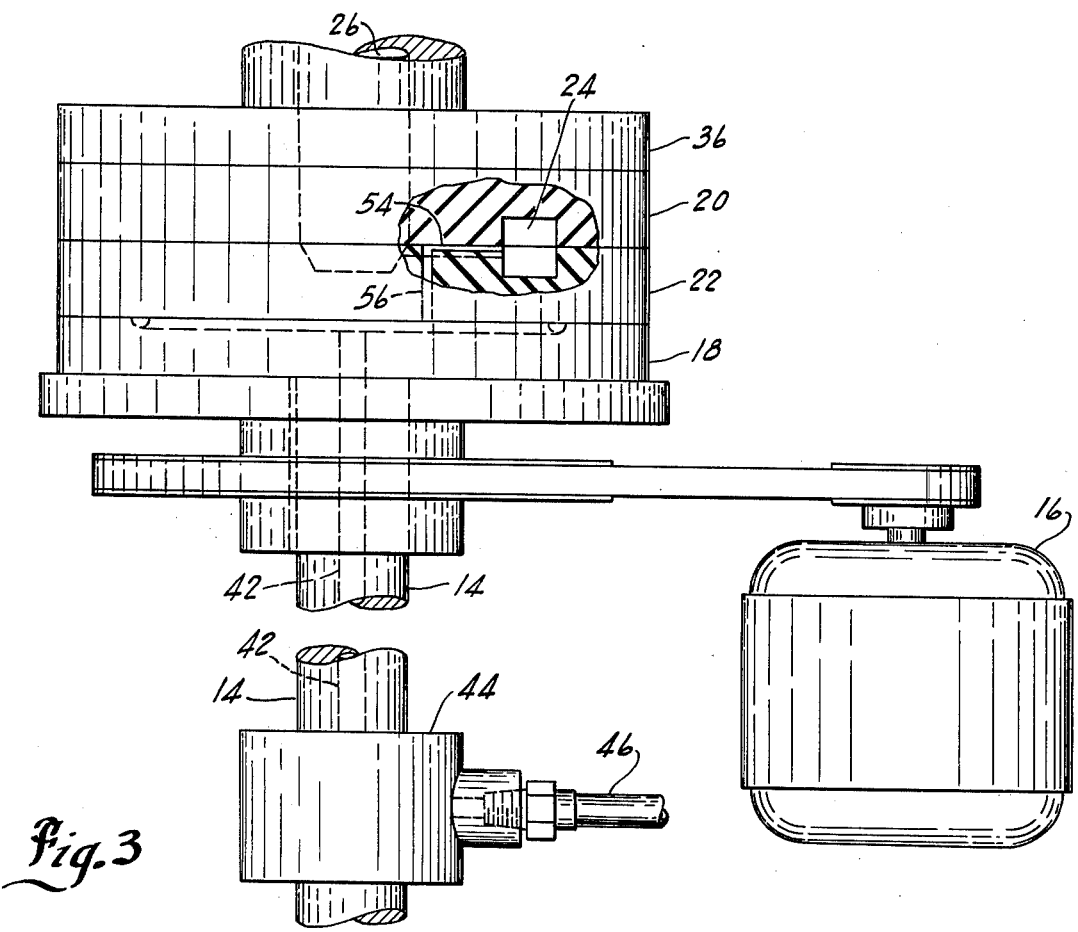
FIG. 3 is a partially broken away elevational view showing one embodiment of the present invention.

The operation of the embodiment shown in FIG. 4 resembles that of the embodiment shown in FIGS. 2 and 3. The vacuum applied to line 42 is passed through conduit 60 to chamber 72 formed on the exterior of the molds and plate by skirt 66 of cap 36. Cavity 24 is connected to chamber 72 as by passage 62 so that the cavity is evacuated during casting.

I claim:

1. In centrifugal casting apparatus having a rotating shaft with a plate thereon for receiving a mold means for coaxial rotation with the shaft, said mold means and plate being generally coextensive in dimension and having peripheral surfaces spaced from the axis of the shaft, the mold means having a cavity positioned for rotation in a plane generally normal to the axis of said shaft, the improvement comprising:

a conduit means extending from the cavity to the peripheral surface of the mold means and opening thereon.

a passage in said shaft and plate having one end connected to a source of vacuum and the other end opening on the peripheral surface of the plate; and a chamber about the plate and mold means extending along the entire peripheral surfaces thereof for forming a connection means between said conduit means and vacuum passage for applying the vacuum to said cavity.

2. The improvement of claim 1 wherein said chamber is formed by a cap over the mold means and plate having sealing means operatively associated with the plate.

3. The improvements of claim 1 wherein the mold means includes a pair of molds having opposing faces with the mold cavity therein and wherein said conduit means comprises a channel along one of the faces.

4. The improvement of claim 1 wherein said vacuum conduit extends through said mold means to the exterior of said mold means.

* * * * *